United States Patent Office 3,508,862
Patented Apr. 28, 1970

3,508,862
PROCESS FOR SEPARATION OF NIOBIUM
AND TANTALUM
Franklin Dee Stevenson and John E. Conway, Ames, Iowa,
assignors to the United States of America as represented
by the United States Atomic Energy Commission
No Drawing. Filed Aug. 4, 1967, Ser. No. 658,989
Int. Cl. C22b 59/00
U.S. Cl. 23—21                6 Claims

ABSTRACT OF THE DISCLOSURE

A method of separating nobium from tantalum by passing a mixture of the two metal pentachlorides, as a gas, through heated calcium oxide and calcium fluoride to form a volatile niobium compound and nonvolatile tantalum compounds, and separating the niobium compound from the tantalum compounds.

CONTRACTUAL ORIGIN OF THE INVENTION

The invention described herein was made in the course of, or under, a contract with the United States Atomic Energy Commission.

BACKGROUND OF THE INVENTION

This invention relates to a process for the separation of niobium and tantalum. More specifically, this invention relates to a process for separating niobium from tantalum by the reaction of their pentachlorides with calcium oxide and calcium fluoride, either simultaneously or successively.

Niobium and tantalum almost invariably occur together in nature. The separation of niobium from tantalum has long presented a problem because most corresponding compounds of these elements possess very similar chemical and physical properties. As a consequence, the present commercial methods for the recovery of niobium and tantalum are complex and expensive. The increasing use of these elements in industry has created a demand for an economical and efficient method for the separate recovery of tantalum and niobium from materials containing a mixture of compounds of the two elements.

Present methods in commercial use for separation of niobium and tantalum employ fractional distillation, fractional crystallization or solvent extraction of various niobium and tantalum compounds. Fractional distillation of the metal pentachlorides to effect separation is difficult because of their similar volatility.

In the fractional crystallization method, after being leached from their ores with hot sodium hydroxide, the niobium-tantalum residue is dissolved in anhydrous hydrofluoric acid, and potassium hydroxide is added. Upon cooling, potassium-tantalum fluoride precipitates, leaving more soluble potassium-niobium oxyfluoride in solution. The niobium solution is then passed through an involved series of steps including precipitation, solution, fractional crystallization, washing and calcining to produce niobium pentoxide.

In the liquid-liquid extraction method, solutions of niobium and tantalum in hydrofluoric acid are extracted with methyl isobutyl ketone. Separation of the two elements is based on the difference of extractability of the elements at different acidities of the solution. At low acidity tantalum is readily extracted and at high acidity the niobium can be extracted by the organic solvent.

These methods are time-consuming and expensive and often provide only enrichment of one element rather than providing a relatively pure product which is usually desired.

SUMMARY OF THE INVENTION

We have invented a process which overcomes a number of the objections to the above-described processes. The process of this invention involves passing niobium and tantalum pentachlorides as a gaseous mixture over calcium oxide and calcium fluoride. The tantalum reacts to form a solid which remains on the calcium beds and the niobium is recovered in a condenser as volatile niobium oxytrichloride. According to one method, the gaseous mixture is passed first over a bed of calcium oxide and then over a bed of calcium fluoride. An alternative method of this invention is to pass the gaseous mixture of niobium and tantalum pentachlorides over a single bed of calcium fluoride which has been superficially coated with calcium oxide. The tantalum remains on the calcium bed as a non-volatile reaction product and the niobium is recovered as volatile oxytrichloride in a condenser.

It is therefore an object of this invention to provide a method for separating niobium from tantalum which is inexpensive and easy to use.

It is a further object of this invention to provide a method of separating niobium and tantalum which gives a niobium product essentially free of tantalum.

DESCRIPTION OF THE PREFERRED EMBODIMENT

These and other objects of the invention can be attained by passing a heated gaseous mixture of niobium pentachloride and tantalum pentachloride over successive beds of calcium oxide and calcium fluoride coated with calcium oxide which have been heated to a temperature of 350 to 400° C. The niobium pentachloride reacts with the calcium oxide to form niobium oxytrichloride, a volatile gas, which is collected in a condenser. This niobium oxytrichloride can then be converted to niobium pentachloride, and reduced to the pure niobium metal by standard means. The tantalum pentachloride reacts with both calcium salts to eventually form a nonvolatile reaction product which remains on the beds, from where it can be readily removed for further processing and purification.

The mixture of pentachlorides of niobium and tantalum used as starting material can be obtained by any method known to those skilled in the art. For example, the mixture may be made by reacting a mixture of niobium and tantalum oxides with chlorine gas under the proper reducing conditions to form niobium and tantalum pentachlorides. Any impurities which form chlorides other than those of niobium and tantalum may be removed by adjustment of condensation temperatures, since these will generally vary to a considerable extent from the condensation temperature of the niobium and tantalum pentachlorides also formed. It is important that the pentachloride gas mixture be heated to approximately the same temperature as the calcium salt bed to prevent condensation of the gas while passing through the bed and to ensure that the gas mixture will react with the calcium oxide and calcium fluoride.

The quantity of calcium oxide and calcium fluoride the pentachlorides pass through must be sufficient to ensure that the necessary reactions take place. This will, of course, be directly dependent upon the amount of the pentachlorides passed through them and can easily be determined by those skilled in the art.

Calcium oxide and calcium fluoride particle size was found to be somewhat important in determining the percentage of recovery of niobium. Calcium oxide of −10 to +28 mesh was used successfully in this work. Recovery was reduced for both larger and smaller particle sizes, other factors being constant.

The temperature of the calcium salt bed was found to be very important. Since the sublimation temperature of the volatile niobium oxytrichloride formed is 337° C., it is important that temperatures be above this point to prevent condensation of the volatile product on the calcium fluoride. However, temperatures which are too high will cause the components to react too rapidly, forming nonvolatile reaction products with an attendant loss of product. Generally a temperature of 350–400° C. was found to be satisfactory, with temperatures of 360–380° C. preferred.

As mentioned previously, separation may be attained by passing the niobium and tantalum pentachloride gas mixture through first a bed of calcium oxide and then a bed of calcium fluoride coated with calcium oxide. Alternatively, the separation may be achieved by using only calcium fluoride which has been coated with calcium oxide. In either method it is, of course, important that there be sufficient calcium oxide present on the calcium fluoride to prevent reaction of the volatile niobium oxytrichloride, which has been formed, with the calcium fluoride, thus reducing the yield of niobium. While this coating could be applied by mechanical means, for example by shaking calcium fluoride particles in a fine powder of calcium oxide, the easiest method of obtaining the coating is to calcine the calcium fluoride in air for a sufficient period of time to form a coating of calcium oxide upon it. An adequate coating which will give a pure product and a high percentage of recovery can be formed by heating the calcium fluoride in an air atmosphere to a temperature of 400–500° C. for a period of about 24 hours. A temperature below 400° C. will not cause formation of calcium oxide, while a temperature above about 500° C. will cause the calcium fluoride to sinter, thereby increasing density, an undesirable result. The time period required to coat the calcium fluoride could be shortened by heating the calcium fluoride in an atmosphere containing increased amounts of water vapor.

It is important that the reaction be run under anhydrous conditions, since both pentachlorides are readily reactive with water and the presence of water vapor would be very detrimental to good product recoveries.

The niobium is recovered as niobium oxytrichloride which is a volatile reaction product. Niobium can be recovered from the niobium oxytrichloride by first reacting it with phosgene or carbon tetrachloride to remove the oxygen and form the pentachloride, which may be readily reduced with hydrogen to form the pure niobium metal.

The following theory is given to explain as well as possible what is believed to be the mechanism of separation of niobium and tantalum pentachlorides by contacting them with calcium oxide and calcium fluoride and is not an absolute explanation by which we wish to be bound.

The formula below is considered to describe the reaction of tantalum pentachloride with calcium oxide.

$$TaCl_5 + CaO \rightarrow TaOCl_3 + CaCl_2$$

$$5TaOCl_3 \rightarrow Ta_2O_5 + 3TaCl_5$$

The tantalum pentachloride reacts with calcium oxide to form tantalum oxytrichloride which is volatile and unstable and immediately breaks down to form tantalum pentoxide and tantalum pentachloride. The pentoxide is a solid which settles out on the calcium oxide. The pentachloride which does not react with calcium oxide reacts with the calcium fluoride:

$$TaCl_5 + NCaF_2 \rightarrow TaCl_5 \cdot (CaF_2)_N$$

to form a complex salt which is also nonvolatile and settles on the calcium fluoride bed.

The reaction of niobium pentachloride with calcium oxide at a temperature range of 350–500° C. also results in the formation of an oxytrichloride:

$$NbCl_5 + CaO \rightarrow NbOCl_3 + CaCl_2$$

In contrast to tantalum oxytrichloride, the oxytrichloride of niobium is relatively stable and does not decompose at a significant rate at this temperature. However, continued contact of the oxytrichloride with calcium oxide will cause formation of a nonvolatile pentoxide and result in reduced product yield.

$$2NbOCl_3 + 3CaO \rightarrow Nb_2O_5 + 3CaCl_2$$

While it is possible to obtain a separation of niobium and pentachlorides by using only calcium oxide, the yield is very low. To determine the effectiveness of calcium oxide as a separation agent, a series of experimental runs were made in which a mixture of gaseous pentachlorides was passed through a varying number of calcium oxide beds. Eight to 10 grams of a feed mixture, which was 80 weight percent niobium pentachloride, were fed at a rate of 4 grams per hour in each run. Experimental conditions were the same for each run except for the number of bed sections. The runs were made sequentially with calcium oxide beds containing from one to five equally sized bed sections in order to determine variation in purity and yield of the products which are shown in the following table.

| Number of beds of CaO | 0 | 1 | 2 | 3 | 4 | 5 |
|---|---|---|---|---|---|---|
| Yield, percent | 100 | 98 | 95 | 90 | 80 | 72 |
| Purity, percent | 80 | 81 | 82 | 84 | 89 | 91 |

$$Yield = \frac{Wt.\ Nb\ in\ Product}{Wt.\ Nb\ in\ Feed}$$

$$Purity = \frac{Wt.\ Nb\ in\ Product}{Wt.\ Nb + Ta\ in\ Product}$$

It can be seen that the yield of the volatile niobium product decreased more rapidly than the purity increased with the increasing number of calcium oxide beds. Thus, tantalum pentachloride was not preferentially converted to the pentoxide and a reasonable yield of a pure niobium product could not be obtained by using calcium oxide alone.

The preferred method of separation of niobium from tantalum is to pass the pentachlorides gas through a calcium oxide bed and then through a calcium fluoride bed. Although product purity was very high when using either method, product yield was greatly improved through the use of separate calcium salt beds, as can be seen by comparing the yields in the following examples.

The following examples are given as illustrations of the process of this invention and are not to be taken as limitations upon the scope and extent of the invention.

EXAMPLE I

A mixture of 1.05 grams tantalum pentachloride and 4.85 grams niobium pentachloride was passed first through a bed of 12.01 grams calcium oxide and then through a bed of 15.06 grams calcium fluoride. The bed temperatures were 380° C. and the feed rate of the pentachloride gas was 5.0 grams per hour. Upon completion of the run, the condenser tube contained 3.50 grams of volatile product for a niobium yield of 90%. The purity of the volatile product was 99.936%. The tantalum was recovered from the calcium salt beds.

EXAMPLE II

In this experiment, a gaseous mixture of 2.32 grams tantalum pentachloride and 1.96 grams niobium pentachloride was fed at a rate of 3.5 grams per hour through a bed of 16.05 grams of calcium fluoride. The calcium fluoride was divided into four separate beds of 4 grams each through which the gas passed consecutively. The calcium fluoride was coated with calcium oxide by calcination of the calcium fluoride in air for 24 hours at 450° C. Bed temperature during the run was 360° C.

Upon completion of the run, it was found that 75.53% of the total available niobium was condensed in the condenser as niobium oxytrichloride and that it had a purity of greater than 99.98%.

It will be understood that the invention is not to be limited by the details given herein but that it may be modified within the scope of the appended claims.

The embodiments of the invention in which an exclusive property or privilege is claimed are defined as follows:

1. A method of separating niobium and tantalum comprising: forming a gaseous mixture of niobium pentachloride and tantalum pentachloride, heating said gas to 350 to 400° C., contacting said gaseous mixture with calcium oxide and calcium fluoride maintained at a temperature of 350 to 400° C. under anhydrous conditions, thereby forming volatile niobium oxytrichloride and a nonvolatile tantalum product, separating said volatile niobium oxytrichloride from said nonvolatile tantalum product, and collecting said volatile niobium oxytrichloride formed.

2. The method of claim 1 whereby said gaseous mixture is passed through a bed of calcium fluoride, said calcium fluoride being coated with calcium oxide.

3. The method of claim 2 wherein said calcium fluoride is coated with calcium oxide by calcining said calcium fluoride in an air atmosphere for about 24 hours at from 400–500° C.

4. The method of claim 2 wherein said bed is at a temperature of from 360 to 380° C.

5. The method of claim 1 whereby said gaseous mixture is first passed through a bed of calcium oxide particles, said particles being of from −10 to +28 mesh in size, and is then passed through a bed of calcium fluoride coated with calcium oxide.

6. The method of claim 5 wherein said beds are at a temperature of from 360–380° C.

References Cited

FOREIGN PATENTS 1,192,431    4/1959    France.
930,335    7/1963    Great Britain.

HERBERT T. CARTER, Primary Examiner

U.S. Cl. X.R.

23—87